Patented June 15, 1937

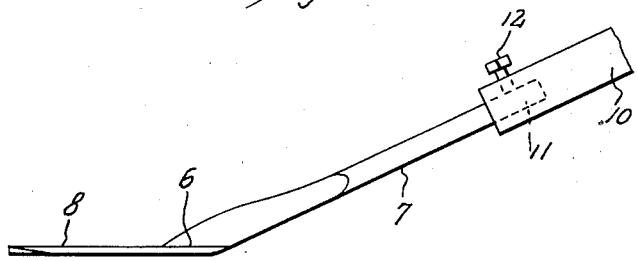
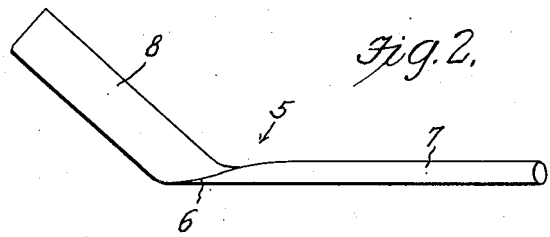
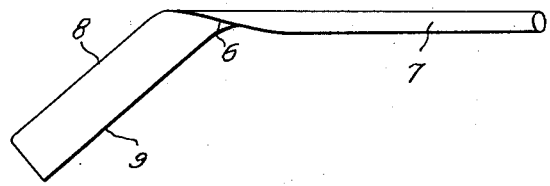

2,083,750

UNITED STATES PATENT OFFICE 2,083,750

SURFACE CULTIVATOR BLADE

Fritz Fred Tennigkeit, Burlington, Colo.

Application June 2, 1936, Serial No. 83,110

1 Claim. (Cl. 97—207)

This invention relates to cultivator shovels or blades and the object of the invention is to provide a blade designed especially to be used for efficiently and readily removing vines and weeds from the surface of the soil.

An object of the invention is to provide a blade of novel construction and characterized by a shank forming an integral part thereof and of such a shape and so disposed relative to the blade as will not tend to collect trash, weeds and dirt as is the objectionable feature of the blades or shovels now generally used for this kind of work.

A further object of the invention is to provide a blade or shovel of the character above mentioned which may be used singly or in pairs and which may be readily attached to the beam or beams of the cultivator.

A further object of the invention is to provide a cultivator blade or shovel which will operate efficiently from either side of the row.

The invention together with its objects and advantages will be best understood from a study of the following description taken in connection with the accompanying drawing wherein:—

Figure 1 is a side elevational view of a cultivator blade or shovel forming part of the present invention.

Figure 2 is a plan view showing a pair of such blades or shovels and

Figure 3 is a transverse sectional view through the blade end of the shovel.

Referring to the drawing by reference numerals it will be seen that the improved cultivator blade or shovel is indicated by the reference numeral 5, and in accordance with the present invention is formed from a single length of wire rod which from a point intermediate its ends to one end of the rod is flat, and which, intermediate the ends of the flat portion of the rod is provided with a twist as at 6 to provide a round elongated shank 7 and a relatively broad elongated blade 8.

Further it will be noted that the blade or shovel so constructed presents an upwardly and forwardly extending shank 7 and a blade 8 disposed parallel with relation to the horizontal and with the blade having its median longitudinal dimension disposed at an acute angle with relation to the corresponding dimension of the handle 7.

In this connection it will be further noted that the blade 8 extends obliquely to the line of draft and that the blade is substantially wedge-shaped in cross section to present at the leading edge of the blade a sharpened cutting edge 9 extending for substantially the full length of the blade.

Further in accordance with the present invention the plow beam a portion of which is shown in the drawing and indicated by the numeral 10 is provided in the end thereof to which the blade 5 is to be attached with a socket 11 which receives the free end of the shank 7 of the blade and which end of the shank is secured in the socket 11 at the desired adjustment through the medium of a set screw or the like 12.

When used with a cultivator of the wheeled straddle-row type a pair of blades or shovels will be used and will be arranged relative to one another, as suggested in Figure 2, and in a manner thought to be clear in the art.

In actual practice it will be found that a blade or shovel unit embodying the features of the present invention will serve to effectively cut and uproot the weeds, and the blade proper being disposed in a horizontal plane and at an obtuse angle to the line of draft a shearing cut throughout the length of the entire blade will be effected when the blade is drawn through the soil. Also by this arrangement of the blade relative to the line of draft and to the shank 7 the weeds and vines will be effectively prevented from collecting or accumulating upon the shank 7 and thus the operator will not be obliged from time to time to leave his position on the plow for the purpose of removing the cut weeds that would otherwise accumulate about the shank.

It is thought that the utility and advantages of an invention of this character will be had without a more detailed description.

Having thus described the invention what is claimed as new is:—

A blade or surface cultivator comprising a single length of metal rod having a relatively flat end portion and a relatively round end portion, said round end portion constituting a shank, and said rod at a point between said ends being provided with a twist whereby the round end portion of the rod presents an upwardly forwardly extending shank and the flat portion of the rod presents a relatively flat blade having its median longitudinal dimension disposed at an acute angle with relation to the corresponding dimension of the shank end portion of the rod, and the blade being also disposed obliquely with respect to the plane of the shank end of the rod, and said blade being also substantially wedge-shaped in cross section to present at one longitudinal edge thereof a cutting edge extending for substantially the entire length of the blade.

FRITZ FRED TENNIGKEIT.